United States Patent [19]

Sarangapani et al.

[11] Patent Number: 5,136,474
[45] Date of Patent: Aug. 4, 1992

[54] PROTON EXCHANGE MEMBRANE ELECTROCHEMICAL CAPACITORS

[75] Inventors: Srinivasan Sarangapani, Walpole; Philip M. Lessner, Watertown; Anthony B. LaConti, Lynnfield, all of Mass.

[73] Assignee: Giner, Inc., Waltham, Mass.

[21] Appl. No.: 654,414

[22] Filed: Feb. 11, 1991

Related U.S. Application Data

[63] Continuation of Ser. No. 503,535, Apr. 3, 1990, abandoned.

[51] Int. Cl.$^5$ .......................... H01G 9/00; B01J 17/00
[52] U.S. Cl. .................................. 361/502; 29/25.03; 252/62.2
[58] Field of Search ............... 361/323, 502, 523–526; 29/25.03, 25.42; 252/62.2

[56] References Cited

U.S. PATENT DOCUMENTS

| | | | |
|---|---|---|---|
| 1,395,931 | 11/1921 | Smith | 361/271 |
| 3,536,963 | 10/1970 | Boos | 361/502 |
| 3,883,784 | 5/1975 | Peck et al. | 361/323 |
| 4,186,423 | 1/1980 | Yoshida et al. | 361/525 |
| 4,224,121 | 9/1980 | Dempsey et al. | 204/98 |
| 4,311,569 | 1/1982 | Dempsey et al. | 204/129 |
| 4,438,481 | 3/1984 | Phillips et al. | 361/502 |
| 4,610,938 | 9/1986 | Appleby | 429/42 |
| 4,630,176 | 12/1986 | Cueller et al. | 361/502 |
| 4,633,372 | 12/1986 | Calahan et al. | 361/502 |
| 4,638,407 | 1/1987 | Lundsgaard | 361/525 |
| 4,730,239 | 3/1988 | Currie et al. | 361/502 |
| 4,731,705 | 3/1988 | Velasco et al. | 361/502 |
| 4,766,522 | 8/1988 | McHardy et al. | 361/501 |
| 4,942,501 | 7/1990 | MacFarlane et al. | 361/523 |

OTHER PUBLICATIONS

33rd Power Sources Symposium, pp. 600, 607, 1988.
ONR Report on Contract #N00014-87-C-0705, Feb. 22, 1988.
The Electrical Double Layer on Oxides: Specific Adsorption of Chloride and Methylviologen on Ruthenium Dioxide—J. M. Kleijn and J. Lyklema—Received Jun. 25, 1986 accepted Feb. 2, 1987.
High Rate Electrodes for Pulse Power, Iridium Oxide and Ruthenium Oxide—G. L. Holleck, B. H. Jackman and R. D. Raugh, May 1988.

*Primary Examiner*—Donald A. Griffin
*Attorney, Agent, or Firm*—Hale and Dorr

[57] ABSTRACT

Disclosed is a high-energy-density all-solid ionomer electrochemical capacitor, completely free of liquid electrolyte. The capacitor includes 1) a three-dimensional metal oxide-particulate-ionomer composite electrode structure, whereby the ionomer coats the individual particles and provides a mechanism for continuous proton transport throughout the composite structure and 2) a unitized repeating cell element that includes this three-dimensional composite electrode structure. The composite electrode structures are bonded to opposite sides of a thin sheet of a solid proton-conducting ionomer membrane and form an integrally bonded membrane and electrode assembly (MEA). The composite electrodes of the MEA are pressed against thin electrically conductive current collectors to form a repeating element in a bipolar cell capacitor arrangement. Energy storage and discharge are achieved by utilizing double-layer and reversible redox processes. High-energy-density is achieved by utilizing select high-surface-area conductive metal oxide powders wherein the individual particles are in intimate contact with a film of a highly ionically conducting solid polymer ionomer.

10 Claims, 4 Drawing Sheets

PROTON EXCHANGE MEMBRANE ELECTROCHEMICAL CAPACITORS

This invention was made with Government support under Contract No. N00014-88-C-0391 awarded by the Department of the Navy. The Government has certain rights in this invention.

This is a continuation of application Ser. No. 503,535 filed on Apr. 3, 1990 and now abandoned.

FIELD OF INVENTION

The present invention is directed to improved electrochemical capacitors. More particularly, this invention relates to a process for making all-solid ionomer-/electrode structures free of liquid electrolyte used in electrochemical capacitors, and to the all-solid ionomer/electrode structures produced by this process.

BACKGROUND OF INVENTION

Bonding of particulate high-surface-area noble metal oxide coatings to a proton-conducting solid polymer (ionomer) membrane for use in chlorine generators and oxygen gas generating devices are disclosed in Dempsey, et al., U.S. Pat. Nos. 4,224,121 and 4,331,569. The former describes a chlorine generating cell having anolyte and catholyte chambers separated by a solid polymer electrolyte in the form of a stable, selectively cation permeable, ion exchange membrane (such as is sold by duPont Corporation under the trademark Nafion(®)), and one or more catalytic electrodes including at least one thermally stabilized, reduced oxide of a platinum group metal bonded to the surface of the membrane. U.S. Pat. No. 4,331,569 discloses a gas generating apparatus and method which utilizes a novel noble metal oxide catalytic oxygen evolving electrode for such electrochemical systems as electrolysis cells and oxygen concentration cells. The electrochemical cells include a catalytic cathode and noble metal oxide catalytic anode positioned on opposite sides of, and in electrical contact with, an ion exchange membrane. In both of the above cited patents, there is an electrochemical generation of a gas from a liquid reactant.

Appleby in U.S. Pat. No. 4,610,938, discloses an improved electrochemical fuel cell wherein the catalytic surface of the electrode comprises a coating of fluorinated acid containing polymer. This device uses phosphoric acid as liquid electrolyte and generates power through the consumption of hydrogen and oxygen at a temperature of 190° C.

Electrochemical capacitors of double-layer type are disclosed in prior U.S. Pats. including Nos. 3,536,963; 4,438,481; 4,630,176; 4,683,407; and 4,730,239. In general, the above patents describe double-layer capacitors which contain high-surface-area carbon structures as the two electrodes and liquid sulfuric acid as the electrolyte. The two electrodes are separated by a porous separator, which isolates the two electrodes electronically, but allows ionic conduction. To avoid the problems associated with the liquid electrolyte such as leakage and manufacturing problems, U.S. Pat. Nos. 4,638,407 and 4,730,239 describe the use of a polymer such as polyethylene glycol imbibed with an inorganic or organic salt to make it conductive as the electrolyte. However, the equivalent series resistance of such devices is large, which results in lower energy delivery and unacceptable discharge behavior for burst power applications.

The present invention avoids the problems associated with the liquid electrolyte by the use of a polymeric ionomer electrolyte. An electrode material is chosen that allows higher intrinsic capacitance through the participation of reversible surface and bulk reactions in addition to the double-layer capacitance. The capacitors described in the above mentioned U.S. Pats. use purely double-layer charge as the means of storing charge.

It is an object of the present invention to provide a high-energy-density all-solid ionomer electrochemical capacitor devoid of any electrolyte in liquid form by the use of solid polymeric perfluorocarbon ionomers. It is yet another object of the present invention to produce particulate-ionomer electrode structures in a membrane and electrode assembly (MEA) that provides a continuous proton-conducting ionic linkage throughout the structure. It is still another object of the present invention to produce a high-energy-density all-solid ionomer electrochemical capacitor in which there is no formation or consumption of either adsorbed or generated gases. It is still another object of the present invention to produce a particulateionomer electrode structure which is both ionically (transports protons) and electrically conductive (transports electrons) and is bonded to opposite sides of a solid proton-conducting ionomer membrane to form an integral all-solid ionomer configuration having unique energy storage and discharge properties on a short term basis (milliseconds to seconds).

SUMMARY OF THE INVENTION

The present invention is directed to a high-energy-density electrochemical capacitor for use when short-term burst power or energy storage is required and which contains a solid proton-conducting ionomer as the sole electrolyte, being completely free of any liquid electrolyte.

In this invention, a solid ionomer is used as the sole electrolyte and an intimate porous electrode-solid ionomer contact is maintained throughout the structure. In the porous electrode-solid ionomer structure, a film of ionomer is formed from the face of the electrode in contact with the solid ionomer membrane separator extending back into the porous electrode toward the current collector. The electrode particles that make intimate electronic contact with each other and with the current collector are coated with a thin solid ionomer film. The ionomer film coating is accomplished using, for example, alcohol soluble degraded Nafion (prepared by autoclaving Nafion 117 polymer). There is a continuous ionomer proton-conducting ionic linkage throughout the porous electrode-solid ionomer composite structure that extends into the solid ionomer membrane, thus there is a continuous mechanism for proton transport from metal collector to metal collector.

The metal oxide particulate electrode material used in the electrochemical capacitor has a high double-layer capacity and pseudocapacity on a real area basis. In order to achieve a high capacitance on a geometric area basis, the material is prepared in very high surface area (50 m$^2$/g or greater). The material is then coated with ionomer and fabricated into a porous electrode forming a high-surface-area interface with the solid ionomer coated film and bonded to the solid proton-conducting ionomer membrane.

It has been unexpectedly found that by 1) ionomer coating very high-surface-area RuO$_x$ (x is approximately 2) particles, 2) forming two identical porous electrodes from the coated particles, and 3) integrally bonding the porous electrodes to opposite sides of a thin, solid ionomer membrane separator to form a membrane and electrode assembly (MEA), and 4) intimately contacting the MEA with Ti terminal current collector plates of the cell hardware, that a device is obtained which, when electrically charged with a D.C. power source, exhibits high capacitance (0.5 to 1 F/cm$^2$) and very high energy delivery at very short discharge times (milliseconds to seconds).

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENTS

Figure 1A:
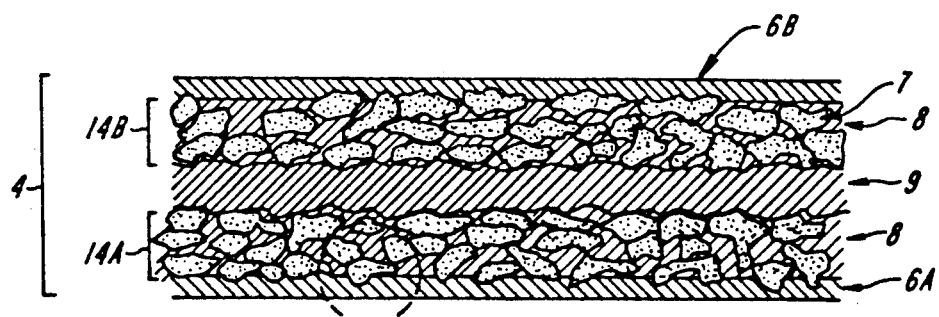
FIG. 1A is an expanded sectional view of the structure of the ionomer-metal oxide particulate porous electrode according to the present invention.

The process developed in this invention is to coat high-surface-area metal oxide particles with solid ionomer and forming an electrode structure from these ionomer-coated particles that provides a continuous mechanism for proton ionic transport throughout the structure. The particulate-ionomer electrode structure is both ionically (proton) and electrically conductive (electrons) and is bonded to opposite sides of a hydrated proton-conducting solid ionomer membrane to form an integral all-solid ionomer configuration having unique energy storage and discharge properties on short-time basis (milliseconds to seconds).

The ionomers used for coating the particles and the solid ionomer membrane preferably are perfluorocarbon sulfonic acid ionomers because of their high proton transport properties and excellent stability. A preferred form of such ionomer is one in which the polymer is a hydrated copolymer of polytetrafluoroethylene (PTFE) and a polyfluorovinyl ether containing pendant sulfonic acid groups. Both the Nafion and Dow ionomers (DOW XUS 13204.10 experimental ionomer membrane supplied by Dow Chemical Company, Midland, MI) used in the following examples contain this structure; the Dow membrane has shorter side chain pendant sulfonic acid groups leading to facilitated proton transport. The sulfonic acid groups are chemically bound to the perfluorocarbon backbone in these ionomers, so the concentration of solid electrolyte remains fixed. After equilibrating the ionomer, the structure of a typical Nafion sulfonated perfluorocarbon (Nafion) sold by duPont is as follows:

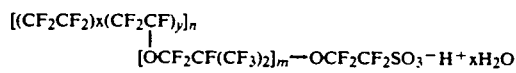

In this present invention, RuO$_x$ and IrO$_x$ (x is approximately 2) particles or metal oxide alloys of Ru and Ir were selected as the electrode materials because of their high surface area and enhanced stability as reported by Dempsey, et al., in the above referenced patents. However in this present invention, the electrochemical capacitance arises from surface processes unique to the many interconnecting metal oxide particle/ionomer interfaces, and in a preferred embodiment there is no electrochemical generation or consumption of gases. Ruthenium dioxide (RuO$_2$) has a high double-layer capacity of about 150 $\mu$F/real cm$^2$ (J.M. Kleijn and J. Lyklema, *Journal of Colloid and Interface Science*, Vol. 120, page 511, 1987). There is also a substantial pseudocapacity due to the surface reaction which can be written approximately for the specific case of RuO$_2$ as:

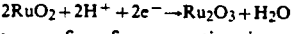

This type of surface reaction in combination with double layer processes has been shown to be capable of sustaining high current densities with minimal voltage decay on the millisecond scale (G.L. Holleck, et al., Abstract No. 18, The 173rd Electrochemical Society Meeting, Atlanta, GA, 1988; H.L. Lee, et al., Final Report for ONR Contract No. N00014-87-C-0705, 1988.

In the recent literature there is a description of an ultracapacitor (R.R. Tong, et al., in *Proceedings of the 33rd International Power Sources Symposium*, 13-16 Jun. 1988, The Electrochemical Society, Pennington, NJ, 1988, p. 600), which consists of an electronically conducting ceramic in contact with sulfuric acid. An energy density of 6.4 Kilojoule/Kilogram (kJ/kg) has been reported for this device. The principal advantage of the present invention over the one quoted above is the elimination of the liquid sulfuric acid electrolyte and the utilization of an ionically conducting solid polymer (ionomer) as the sole electrolyte. Sulfuric acid leakage can cause both safety and operational problems, such as a common electrolyte path, which prevents practical operation of capacitor cells, electrically connected in series as in a bipolar cell configuration.

Figure 1B:
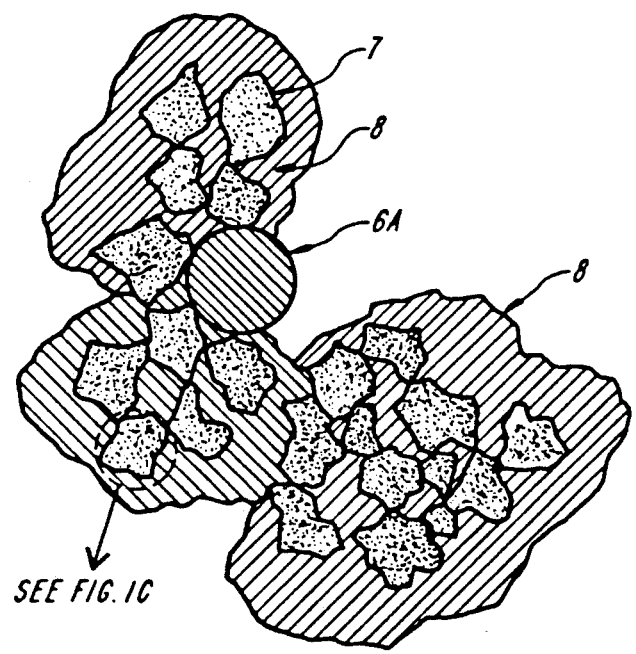
FIG. 1B is an enlarged view of the circled portion of FIG. 1A.
Figure 1C:
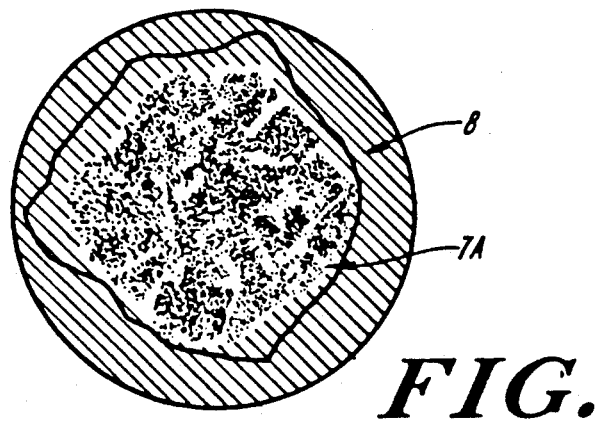
FIG. 1C is an exploded view of the circled portion of FIG. 1B.

Referring primarily to FIG. 1A-1C, a porous electrode-solid ionomer of the present invention is shown in which there is a continuous solid proton transport path 8 (provided by the proton-conducting solid polymer ionomer) throughout the porous electrode-ionomer/ionomer membrane/porous electrode-ionomer configuration 4. The RuO$_x$ particles 7 throughout the structure are coated with ionomer 8 to provide a continuous proton transport path and are in intimate contact with each other. The metal oxide-particulate-ionomer electrode 14A made of the ionomer-coated particles 7 are bonded to, and in intimate contact with a first surface of the ionomer membrane 9; a second metal oxide-particulate-ionomer electrode 14B is in contact with the second surface, said second surface being the surface of said membrane opposite to said first surface. Transmission electron microscopic observation of the high-surface-area RuO$_x$ particles shows particles having a pore size of less than 500 Å with a very fine porous substructure. The outside surface of the particles 7 and their porous substructure 7A have some coating of ionomer 8. FIG. 1A-1C shows the integrally bonded structure in intimate contact with Ti collectors 6A and 6B to form a singlecell capacitor or a multicell bipolar cell configuration depending on the number of membrane and electrode assemblies used. There is intimate contact between solid ionic components of the cell. A continuous ionomer coating exists throughout the structure shown in FIG. A-1C, resulting in a solid proton transport path from Ti collector 6A to Ti collector 6B.

Figure 2:
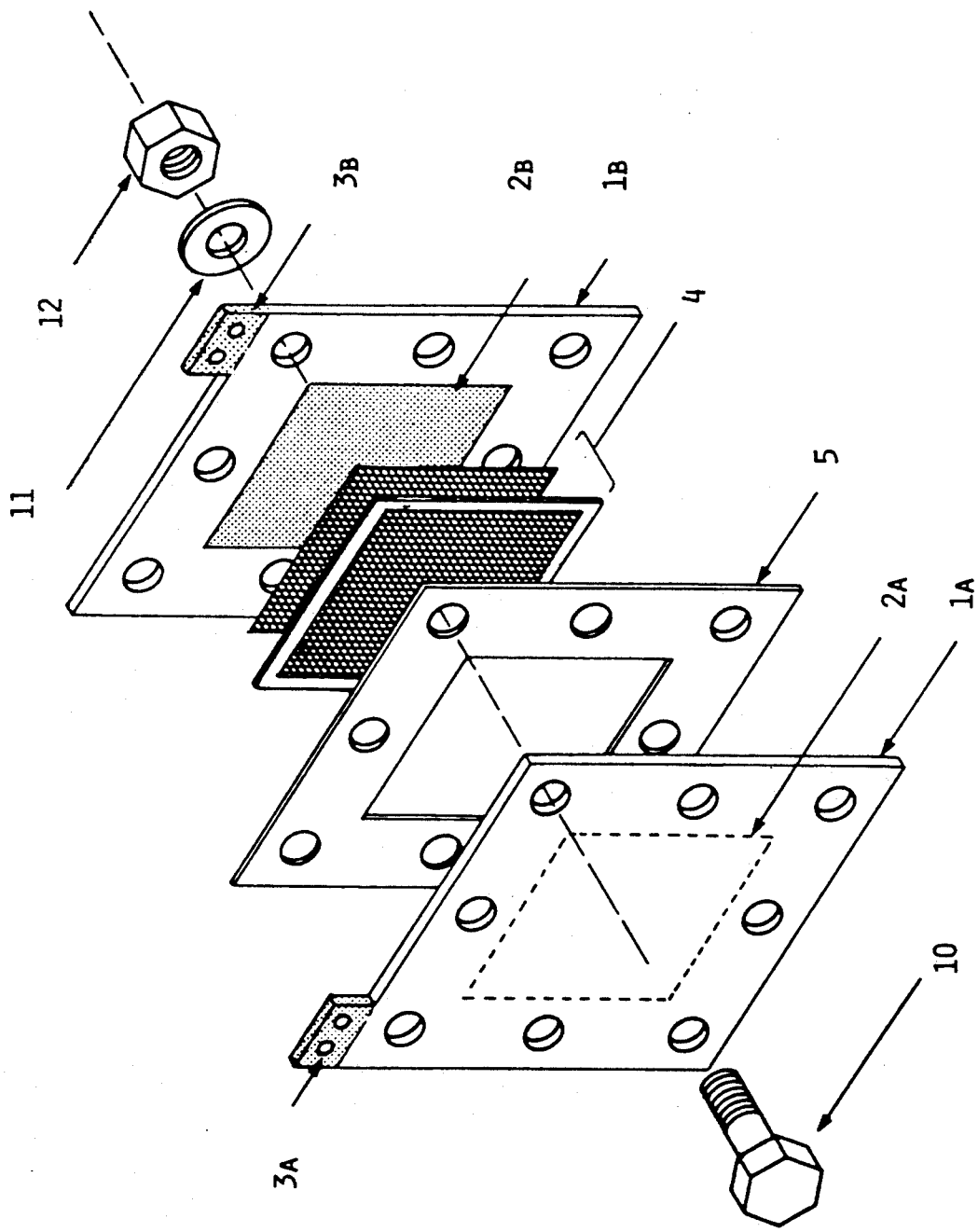
FIG. 2 is an exploded view of the capacitor cell hardware depicting the integrally bonded structure from FIG. 1, the gasketing and the Ti terminal current collector plates.

Referring to FIG. 2, the membrane and electrode assembly 4 is assembled into a cell by compressing the MEA 4 and a gasket 5 between two conductive end plates 1A and 1B The end plates can be titanium or another metallic or carbon material. The end plates are lightly plated with platinum on the area which contacts the MEA 2A and 2B as shown in FIG. 2. Other suitable coatings for the contact area include platinum alloys, gold, and gold alloys. The assembly of end plates, gaskets and MEA is held together in compression by the use of insulated bolts 10, insulated washers 11 and nuts 12. For clarity, only one set of bolt, washer, and nut hardware is shown. The cell delivers its energy to the external circuit through tabs 3A and 3B. Preferably, these tabs are plated with gold or a gold alloy to minimize contact resistance between the tabs and connecting leads.

Table I shows some typical values for the internal resistance, capacitance and energy densities obtained with different cell configurations (to be discussed in the examples provided below).

TABLE I

CHARACTERISTICS OF SINGLE- AND MULTI-CELL DEVICES

| Type | Internal[a] Resistance (Ω-cm²) | Capacitance[a] (Farad/cm²) | DC Energy[b] Density (Joule/cm³) |
|---|---|---|---|
| $RuO_x$-BP[c]/Nafion 117[e] | 0.40 | 1.0 | 5.9 |
| $RuO_x$-BP[c]/DOW[f] | 0.18 | 1.3 | 6.6 |
| 3-Cell ($RuO_x$-HTBP[d]/Nafion 117[e]) | 0.30 | 0.78 | 4.3 |
| 5-Cell ($RuO_x$-HTBP[d]/DOW[f]) | 0.13 | 0.84 | 4.5 |

[a] Per Membrane Electrode Assembly
[b] Based on active volume
[c] Black Pearls 2000 carbon, Cabot corporation, Billerica, MA
[d] Black Pearls 2000 carbon heat treated at 2700° C.
[e] Perfluorocarbon sulfonic acid ionomer Type 117 manufactured by duPont under the trademark Nafion ®
[f] Dow XUS 13204.10 ionomer Table II compares commercially available capacitors with the present invention. The present invention is an order of magnitude better than the most advanced commercially available capacitor device.

TABLE II

COMPARISON OF FIGURES OF MERIT OF CAPACITORS

| Device | Farad/cm² | Watt hr/L(DC) | Joule/cm³ | KJ/KG[d] |
|---|---|---|---|---|
| Tantalum[a] | 0.001 | 0.05 | 0.01–0.1 | 0.001–0.01 |
| NEC FA-Series[b] | 3 | 0.5 | 0.4 | 0.2 |
| This Invention[c] | 0.8 | 1.5 | 5 | 2 |

Figure 3:
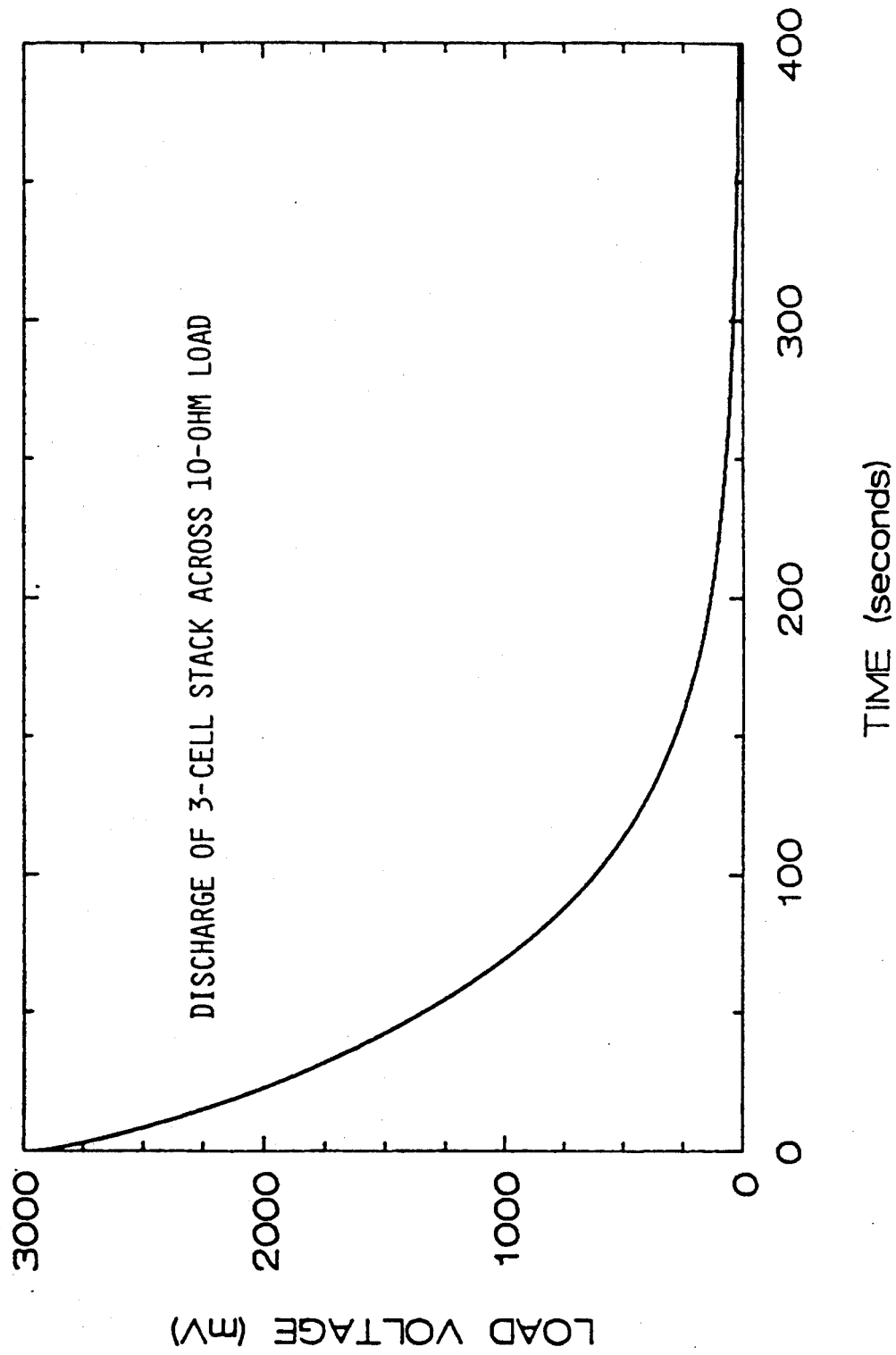
FIG. 3 is a potential-time discharge curve observed for a three-cell bipolar capacitor having dual-layer carbon/RuO$_x$-ionomer electrode structures integrally bonded to Nafion 117 perfluorocarbon sulfonic acid ionomer membrane.
Figure 4:
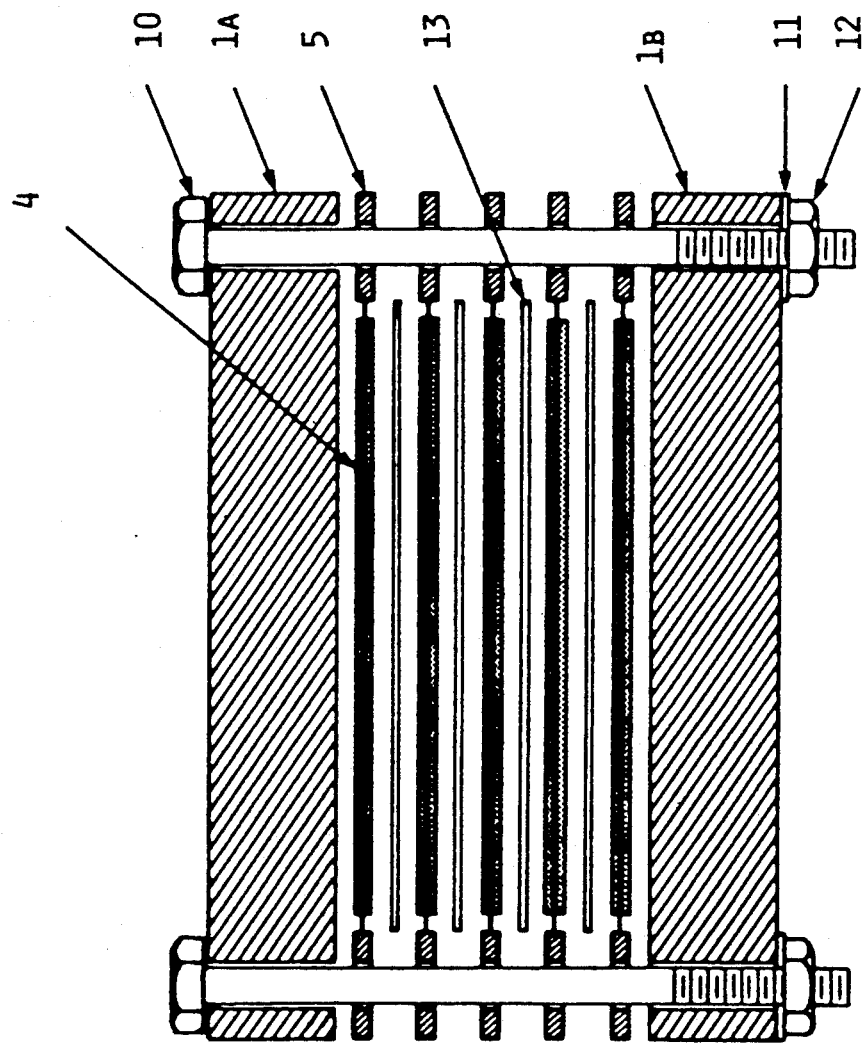
FIG. 4 is a schematic diagram of a multi-cell capacitor hardware depicting the bipolar arrangement of several MEA's, with the end plates acting as terminal current collector plates.

[a] Sprague Electric Company product information
[b] Nippon Electric Company (NEC) Supercap application bulletin for FZ and FA series battery-like carbon/$H_2SO_4$ capacitors that can protect circuits against temporary power shutdowns
[c] Solid ionomer capacitor of the present invention with unitized proton transport membrane/particulate-ionomer/(Ti foil) repeating bipolar element. Calculation based on active material
[d] Kilojoule/Kilogram FIG. 3 shows a typical discharge behavior of a three-cell capacitor device, made according to the present invention. The details of this particular cell and the method of calculation of capacitance and energy delivered are described more fully in Example-9. FIG. 4 shows a typical multiple-cell assembly described later in Example-9.

Having described the invention in general terms, the following examples are set forth to more particularly illustrate the invention. However, they are not to be construed as limiting. Other embodiments can be conveniently produced without departing from the scope of the instant invention.

EXAMPLE-1

A gold-plated titanium screen is sprayed lightly on both sides with 10% fluoroethylene propylene polymer emulsion. The screen is then placed on a sheet of porous polytetrafluoroethylene (Gore-Tex Corporation, NJ) having 1-μm pores and sintered at 320° C. for 10 minutes. Polytetrafluoroethylene powder (duPont Corporation, Teflon(®) Type T-7) is mixed with the electrode (or electrode-ionomer) powder. Typically, 25 wt% polytetrafluoroethylene is used. The electrode powder-polytetrafluoroethylene mixture is then mixed and spread on the screen. The composite is sintered for 15 minutes at 350° C. The electrode is then pressed at 10,000 psi between 5 mil nickel foils for 15 seconds. After pressing, the porous polytetrafluoroethylene backing is removed.

The electrodes are bonded to hydrated perfluorocarbon ionomeric membranes (Nafion 117 of duPont Corporation). The electrode and the membrane are placed in between niobium sheets in an 8"×10" frame. An initial pressure of 15 tons is used. The press is heated to 350° F. and the pressure is raised to 30 tons. At 350° F., the pressure is released and the assembly is cooled. After cooling, the membrane and electrode are immediately removed and soaked in distilled water.

High-surface-area $RuO_x$ electrodes, containing no ionomer coating and having a $RuO_x$/Teflon loading of 10 mg/cm² prepared as above, when tested using cyclic voltammetric method give a capacitance of 0.060 Farads/cm², i.e., 6 Farads/gram (F/g) of active material.

EXAMPLE-2

Teflon-bonded $RuO_x$ electrodes were prepared as described in Example-1. This electrode was then impregnated with a solution of 1100 EW Nafion ionomer (5% solids in an alcohol-water solvent, Solutions Technology, Mendenhall, PA.) under vacuum. The impregnated electrode was then assembled into an MEA as in Example-1. The capacitance as measured by cyclic voltammetry was 0.324 F/cm².

EXAMPLE-3

A paint of $RuO_x$ in a solution of 1100 EW Nafion ionomer was prepared by suspending and dispersing $RuO_x$ particles in the Nafion solution. This suspension was painted directly onto a Nafion 117 membrane. Several coatings of paint was used to increase the loading of the oxide. Multiple thin coatings also avoided mud-flat cracking of the coated deposit. After thorough drying of the coating, a current collector screen was hot pressed into the assembly.

EXAMPLE-4

A paint of $RuO_x$ in a solution of 1100 EW Nafion ionomer was prepared by suspending and dispersing $RuO_x$ particles in the Nafion solution. The $RuO_x$-Nafion suspension was painted onto an oxidized metal foil, allowed to dry by evaporating the alcohol-water solvent in an oven at 70° C. for 1-3 hours and then transferred to the membrane by hot pressing. Oxidized Ti and Nb foils have been used; electrodes transfer best from oxidized Nb. After transferring the electrode, the current collector screen was pressed in.

The capacitance data as a function of $RuO_x$ content of the electrode (made according to this example) is shown in Table III. Capacitance of up to 0.5 $F/cm^2$ (~10 F/g) was achieved at the 22 $mg/cm^2$ electrode loading.

TABLE III
CAPACITANCE AS A FUNCTION OF LOADING FOR A HIGH-SURFACE-AREA $RuO_x$-IONOMER POROUS ELECTRODE

| $RuO_x$ Loading ($mg/cm^2$) | Capacitance ($F/cm^2$) |
|---|---|
| 5.1 | 0.252 |
| 8.6 | 0.265 |
| 9.6 | 0.298 |
| 14.8 | 0.343 |
| 21.7 | 0.488 |

EXAMPLE-5

A mixed Ru, Ir oxide (50 at% Ru+50 at% Ir) alloy (149 $m^2/g$ surface area) when used to make an MEA as described in Example-4 gave a capacitance of 0.403 $F/cm^2$ for a catalyst loading of 5 $mg/cm^2$. This corresponds to a capacitance of 80 F/g.

EXAMPLE-6

A $RuO_x$ powder (~50 $m^2/g$) dispersed with a small quantity of Triton X-100 ® surfactant (Rohm and Haas) during paint preparation ($RuO_x$ and 1100 EW Nafion slurry), and made into an MEA as described in Example-4 gave a capacitance of 1 $F/cm^2$.

EXAMPLE-7

A layer of Black Pearls (Cabot Corp.) carbon black powder was bonded to a Pt-plated Ti screen. The $RuO_x$ powder was then dispersed with a solution of 5% 1100 EW Nafion in alcohol-water (Solution Technology) so as to have 15 wt% Nafion in the final electrode. The slurry was then painted on the carbon layer to a loading of 15 $mg/cm^2$ and allowed to dry at 70° C. The $RuO_x$-particulate/carbon-ionomer electrodes were then bonded to the membrane by hot pressing, as described in Example-1.

An MEA made according to the above procedure, with a Nafion 117 membrane gave a capacitance of 1.20 $F/cm^2$; MEA with Nafion 111 membrane gave 1.17 $F/cm^2$ and a Dow perfluorocarbon membrane gave 1.13 $F/cm^2$. An MEA made according to the above procedure except that a solution of 1100 EW Nafion ionomer was used to paint the carbon layer instead of a $RuO_x$ suspension in Nafion solution, gave only a capacitance of 0.16 $F/cm^2$.

EXAMPLE-8

An MEA made according to Example-7, except that pure $IrO_x$ powder (~16 $mg/cm^2$ loading) was used in place of $RuO_x$. The membrane used in the assembly was Nafion 117. The capacitance per unit area of this MEA was 1.4 $F/cm^2$; the equivalent series resistance, 1.25 $ohm\text{-}cm^2$ was much higher than the $RuO_x$ capacitor cell.

EXAMPLE-9

A layer of Black pearls carbon black powder which was heat treated at 2700° C. before use was bonded to a Pt-plated Ti screen. Six electrodes with a $RuO_x$-Nafion layer were then made as described in Example-7. Three MEAs were made from these electrodes as described in Example-1. The three MEAs were then compressed into a stack using the hardware shown in FIG. 2. The three-cell stack was charged to 3 volts and then discharged through a 10-ohm load. The discharge curve is shown in FIG. 3. The charge delivered by the capacitor was calculated from the data in FIG. 3 by integration of the voltage-time curve; the capacitance was calculated by dividing the charge by the voltage, and the energy delivered to the load was determined from the voltage-time discharge data.

The calculated capacitance and energy delivery were used to compute the entries in Table I.

EXAMPLE-10

Five capacitor cells were assembled into a bipolar stack using the cell hardware shown in FIG. 4. This was accomplished by pressing 2"×2" electrodes ($RuO_x$-HTBP) into a 2.25"×2.25" Dow membrane. Each M and E was individually gasketed with two electrode gaskets and a membrane gasket. A Pt-plated Ti sheet, 13, (0.001 inch thick) was placed between each MEA (FIG. 4) and functioned as a bipolar element. The five MEAs were stacked between the terminal plates and the stack was compressed using insulated bolts to 80 in-lbs.

In the above examples various modifications can be made in the process as long as the metal oxide particles are in intimate contact with a solid ionomer and said metal oxide-particulate-ionomer electrodes are contacted to and separated by a solid proton-conducting ionomer membrane. Alternative ionomers that are known in the art such as partially fluorinated vinyl or vinylidine or polystyrene sulfonic acid polymer (Chlorine Engineers, Japan; RAI, Hauppage, NY) membranes could also be used depending on the power and stability requirements. The typical thickness of the solid ionomer membranes can vary from 0.0005 to 0.010 inch with the preferred range 0.001 to 0.007 inch. Generally, the thinner the membrane the higher the ionic conductivity and transport. For the examples above Nafion 117 membrane has a unit thickness of 0.007 in., Nafion 111 membrane 0.001 in. and the Dow membrane 0.004 in.

The high-surface-area particles used in the examples were a Ru-Ir oxide alloy material and $IrO_x$. Other high-surface-area metal oxide particulates such as binary or ternary alloys of Ru or Ir could be used especially those described in U.S. Pat. Nos. 4,224,121 and 4,311,569 containing Ru and/or Ir partially alloyed as the oxides with transition metals such as Ti, Zr, Hf, Ta.

It is also possible to prepare high-surface-area particles of $RuO_x$, $IrO_x$ and alloys thereof dispersed on high-surface-area carbon substrates such as Vulcan XC-72 ® (Cabot Corporation) and Black Pearls 2000 ® (Cabot Corporation) substrate and coat the ensuing particles with ionomer as described in the above examples. This would be particularly advantageous when low loadings of the noble metal are required to reduce the electrode costs.

Several methods of formation of the ionomer film on the metal oxide particles were described in Examples 1, 2, and 3 above. Other methods may be used to form the coating. For example, the ionomer (such as Nafion) may be added as a fine powder to the electrode before hot-pressing. The dry ionomer powder may be added by calendering, electrostatic spraying, silk screening, or spraying methods. Furthermore, precursors of the ionomers may be applied to the metal oxide powder or the electrode. Also, the ionomer or precursor of the ionomer may be cross-linked using suitable chemical agents or heat or radiation. Polymers having ionomer units of any lengths may be utilized.

For the bipolar separator elements used in Examples 7 and 8, it is possible to use a thin electrically conductive foil of a material selected from the valve metal group comprising Ti, Zr, Ta, Nb, and also carbon. These foils may be solid or porous sheet form. Since no gases are evolved and there is no liquid electrolyte, the porous separators are possible candidates.

In the above examples the only liquid present is water. It is also possible to add miscible non-electrolytes such as ethylene glycol, glycerol and other liquids to increase the operating temperature range over which these electrochemical capacitors could operate. It is also possible to extend this temperature range through use of pressure.

While the foregoing invention has been described with reference to its preferred embodiments, various alterations and modifications may occur to those skilled in the art. All such alterations and modifications are intended to fall within the scope of the appended claims.

We claim:

1. A process for producing a high-energy-density all-solid ionomer electrochemical capacitor comprising the steps of:
   coating high-surface-area metal oxide particles with a solid ionomer electrolyte;
   forming said high-surface-area metal oxide particles into a metal oxide particulate-ionomer electrode structure;
   integrally bonding said metal oxide particulate-ionomer electrode structure to a proton-conducting solid ionomer membrane to form a membrane and electrode assembly (MEA) that provides a continuous proton-conducting ionic linkage throughout the structure.

2. The process of producing a high-energy-density all-solid ionomer electrochemical capacitor of claim 1, wherein said high-surface-area metal oxide particles are $RuO_x$ particles coated with a perfluorocarbon sulfonic acid ionomer and wherein said step of bonding said proton-conducting solid ionomer membrane comprises placing the $RuO_x$ particulate-ionomer structure in intimate contact with a hydrated perfluorocarbon sulfonic acid membrane.

3. The process for producing a high-energy-density all-solid ionomer electrochemical capacitor of claim 1, wherein said high-surface-area metal oxide particulates are high-surface-area Ru-Ir oxide particles coated with a perfluorocarbon sulfonic acid ionomer film or films, and wherein said step of bonding said electrode structure to a proton-conducting solid ionomer membrane comprises the step of placing said metal oxide particulate ionomer structure in intimate contact with a hydrated perfluorocarbon sulfonic acid membrane.

4. The process of producing a high-energy-density all-solid ionomer electrochemical capacitor of claim 1, wherein said high-surface-area metal oxide particles are $RuO_x$ particles and carbon powder coated with a perfluorocarbon sulfonic acid ionomer and wherein said step of bonding said electrode structure to a proton-conducting solid ionomer membrane comprises placing said metal oxide particulate-ionomer electrode structure in intimate contact with a hydrated perfluorocarbon sulfonic acid membrane.

5. The process of producing a high-energy-density all-solid ionomer electrochemical capacitor of claim 1, wherein said high-surface-area metal oxide particles are $IrO_x$ particles and carbon powder coated with a perfluorocarbon sulfonic acid ionomer and wherein said step of bonding said electrode structure to a proton-conducting solid ionomer membrane comprises placing said metal oxide particulate-ionomer electrode structure in intimate contact with a hydrated perfluorocarbon sulfonic acid membrane.

6. A high-energy-density, all-solid ionomer electrochemical capacitor comprising:
   a hydrated proton-conducting solid ionomer membrane as the sole electrolyte;
   a first metal oxide-particulate-ionomer electrode in contact with a first surface of said membrane;
   a second metal oxide particulate-ionomer electrode in contact with a second surface of said membrane, said second surface being the surface of said membrane opposite to said first surface;
   thin metal electronically conducting collectors in contact with said electrodes to form a membrane and electrode assembly;
   cell hardware enclosing said membrane and electrode assemblies that allows electrochemical proton transport to occur from one thin metal collector to the other through the said electrode-solid ionomer structure and allows reversible electrode surface reactions and double-layer process;
   an electrical circuit for charging and discharging said cell.

7. The capacitor of claim 6, wherein said cell hardware only allows surface reactions and double-layer processes to occur without formation or consumption of either adsorbed or generated gases.

8. The capacitor of claim 6, wherein said first and second particulate-ionomer electrodes are ionically (transports protons) and electrically conductive (transports electrons) so that when said electrodes are bonded to opposite sides of said hydrated proton-conducting solid ionomer membrane to form an integral all-solid ionomer membrane and electrode assembly, said membrane and electrode assembly displaying unique energy storage and discharge properties on short-time basis (milliseconds to seconds).

9. The capacitor of claim 6, further comprising plurality of said membrane and electrode assemblies with a bipolar separator positioned between each pair of the membrane and electrode assemblies, said bipolar separator being a thin electrically conductive foil.

10. The capacitor of claim 9, wherein said conductive foil is of a material selected from the valve metals group comprising Ti, Zr, Ta, N, and also C.

* * * * *